Figure 1:
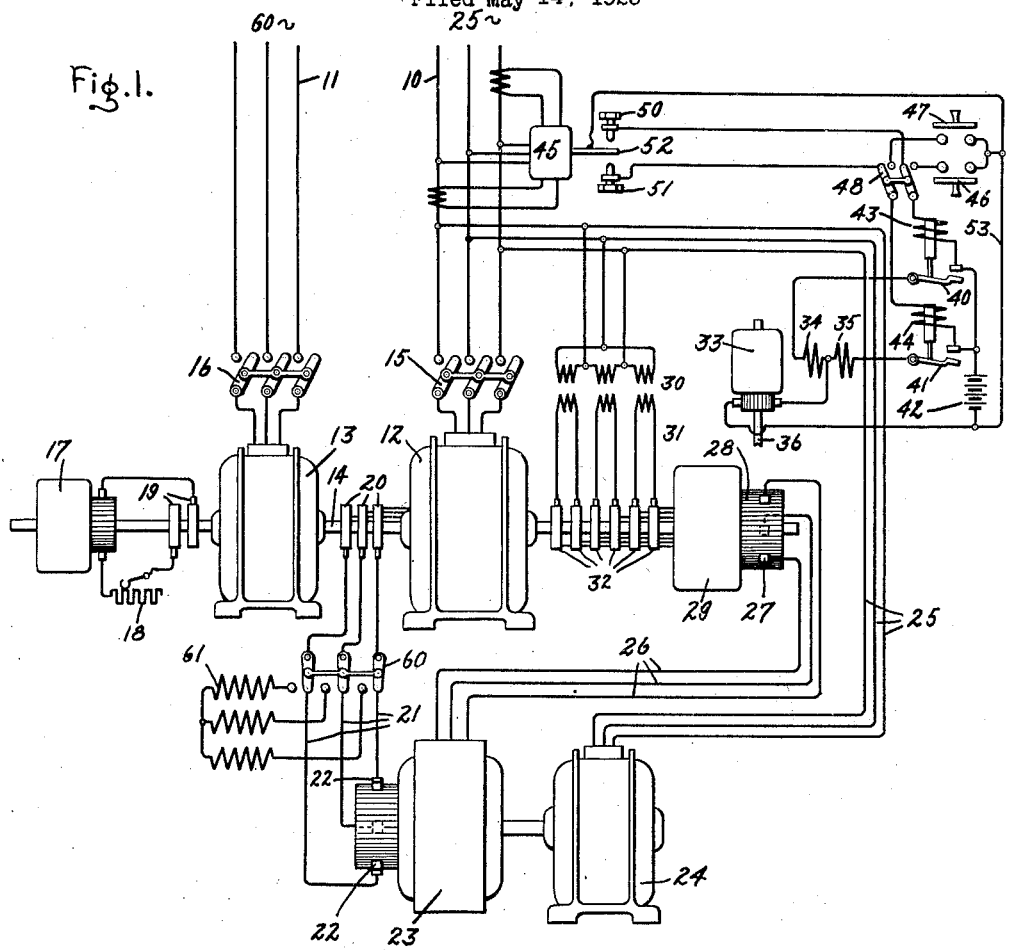

July 20, 1926.

C. M. GILT 1,593,400

FREQUENCY CONVERTER

Filed May 14, 1923

Inventor:
Carl M. Gilt,
by
His Attorney.

Patented July 20, 1926.

1,593,400

UNITED STATES PATENT OFFICE.

CARL M. GILT, OF BROOKLYN, NEW YORK, ASSIGNOR TO GENERAL ELECTRIC COMPANY, A CORPORATION OF NEW YORK.

FREQUENCY CONVERTER.

Application filed May 14, 1923. Serial No. 638,756.

My invention relates to frequency converters and has for its main object the provision of a frequency converter or tie, adapted to be inserted between two alternating current systems which will allow of a greater flexibility as regards the selection of the pole numbers of the machines used, the exact ratio of frequency conversion and the direction and amount of load transferred thereby than has been possible with previous types of frequency converters.

It often happens that it is advisable to tie together two alternating current systems of different frequencies. In the past this has been accomplished by means of a frequency converter set consisting of two or more synchronous dynamo electric machines having the correct number of poles and speeds and mechanically connected so that the frequency, number of phases and voltage of each machine corresponds to that of the system to which it is tied. The combined unit consists of a reversible motor generator set, either end of which is a synchronous motor, the other end acting as a synchronous generator. In certain special cases one or both of the machines used is of the induction type in which case, however, there is no fixed ratio of frequency conversion as the ratio changes with every change of load.

The ordinary form of frequency converter set possesses certain inherent disadvantages when used to connect two independent power systems. If one machine of the set is an induction motor with adjustable resistances in its secondary, a slight speed adjustment in the range below synchronism is possible, but such an arrangement does not permit the motor speed being increased through synchronism, which expedient may be very desirable for synchronizing purposes. Furthermore, such an arrangement does not permit of the reversal of the direction of load transferred through the set with a fixed frequency relation between the two interconnected systems, nor of a change in the magnitude of the load transferred in a given direction except by undesirable losses in the secondary resistance. If the set comprises two synchronous machines, the direction and magnitude of load transfer depends upon the phase relation of two interconnected systems having a fixed frequency relation. The load adjustment is thus rendered difficult, particularly where there are a number of generating units located at different places and not under the immediate control of one operator.

In order to overcome the above mentioned difficulties, I provide a new type of frequency converter which makes it possible to change the speed of the converter through synchronism when it is tied to one of the systems only, thereby making it possible to synchronize the set with the other system without any adjustment of the generating units which supply the systems. By means of an adjustment of the control of the set, the amount and direction of the load transfer can be efficiently varied at will by the operator at the set.

My improved frequency converter preferably consists of one synchronous alternating current dynamo electric machine which may act either as a motor or a generator and a directly connected induction machine of the wound secondary type of sufficient capacity to drive the synchronous machine as a generator, together with apparatus for controlling the speed frequency relation of the induction machine for a given load. The speed control apparatus which I prefer to use consists of an exciter for supplying the necessary voltage and frequency to the secondary winding of the induction machine, together with means for regulating the voltage and frequency of the exciter in a manner to vary the speed of the main induction machine when operating as a motor, or its load when operating as a generator. This type of regulating apparatus is commonly known as the "Scherbius" speed control for induction motors of which there are various modifications.

In this type of speed control there is a certain speed regulation for a change in load at any given setting of the control so that it is possible to change the load at any given speed by changing the control setting. This change in the control may be accomplished manually or automatically. A contact making meter such for example as an ammeter or wattmeter may be connected in the load circuit to hold constant load or to prevent overload, but which does not change the control adjustment as long as the load remains within certain limits and by which means a flexible and adjustable means of tieing two systems of alternating current frequency together is provided.

Figure 2:
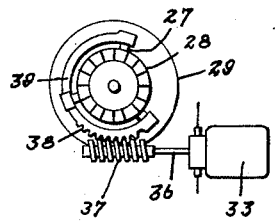

The features of my invention which I believe to be novel and patentable will be pointed out in the claims appended hereto. For a better understanding of my invention, reference is made to the accompanying drawings in which Fig. 1 represents a preferred arrangement of the apparatus and the electrical connections therefor; and Fig. 2 illustrates an end view of the brush regulating mechanism for the ohmic drop exciter shown in Fig. 1.

Referring to the drawings, 10 and 11 represent alternating current distribution systems of different frequencies, for example 25 and 60 cycles respectively. 12 and 13 represent the main machines of the frequency converter having their rotating elements represented as being mounted on the same shaft 14. For the frequency and connection given, the machine 12 may comprise a 4-pole induction machine of the wound rotor type adapted to be connected to the 25 cycle system by line switch 15 and the machine 13 may comprise a 10-pole synchronous machine adapted to be connected to the 60 cycle system by a line switch 16. The rotating field of the synchronous machine is excited from a direct current exciter 17 shown mounted on shaft 14 and connected to the field of machine 13 through an adjustable field rheostat 18 and slip rings 19. The synchronous speed of machine 13 is in this case 720 R. P. M. and fixes the rated speed of the set. The synchronous speed of the induction machine 12 is, for the conditions named, 750 R. P. M., but it may readily be made to run either as a motor or a generator at 720 R. P. M. by means of the control apparatus now to be described.

In the arrangement shown, the rotor of the induction machine 12 is arranged to be connected through slip rings 20, lines 21 and brushes 22 to the commutator of the regulating machine 23. A switch 60 is preferably included in the lines 21 for the purpose of connecting the slip rings 20 to a starting resistance 61. The regulating machine 23 is direct connected in this instance to a squirrel cage induction machine 24 which machine is electrically connected to the 25 cycle system 10 by means of line 25. The stator of the regulating machine 23 is excited through lines 26 and brushes 27 from the commutator 28 of an ohmic drop exciter 29 mounted on shaft 14 of the frequency converter set. The rotating member of exciter 29 is fed from the 25 cycle system 10 through suitable step-down transformers 30, lines 31 and slip rings 32.

It is well known that by means of the so-called Scherbius control, one modification of which is here described, the speed of a wound secondary induction machine may be varied from considerably above synchronism to considerably below synchronism and vice versa and may be made to operate either as a motor or a generator at any such speed by regulating the excitation supplied to or taken from its secondary. The theory of operations of such regulating apparatus is fully set forth for example in U. S. Patent 1,085,151 or 1,306,594. It will be evident from an inspection of these patents that the regulating apparatus here described is only one of a number of posssible arrrangements suitable for this purpose. Where the amount of regulation desired is relatively small, as in the present case, it may readily be accomplished by shifting the brushes on the ohmic drop exciter so as to regulate the voltage supplied by it to the regulating machine 23 which in turn will effect the corresponding regulation of the voltage impressed upon the secondary of the main motor 12.

In the modification shown I have provided a motor 33 illustrated as being of the direct currrent type with series fields 34 and 35 for shifting the brushes 27 of the ohmic drop exciter 29. As illustrated in Fig. 2, shaft 36 of the motor 33 is provided with a worm 37 which meshes with a worm gear 38 integral with the brush yoke 39 of the ohmic drop exciter. The armature of motor 33 is adapted to be connected through field coil 34 and a contactor 40 to a source 42 for operating the motor in one direction and through field coil 35 and a contactor 41 to source 42 for operating the motor in the reverse direction. The contactors 40 and 41 are provided with operating solenoids 43 and 44 respectively which are arranged to be controlled either automatically as by a contact making meter 45, or manually, as by switches 46 and 47. The source 42 is utilized for energizing the coils of the solenoid and one terminal of each coil is permanently connected to said source. The other terminals of the coils are respectively connected to the blades of a double-pole, double-throw switch 48. When this switch is thrown to the left as illustrated, solenoids 43 and 44 are connected to stationary adjustable contacts 50 and 51 respectively of the contact making meter 45. The movable contact 52 of the meter is arranged to cooperate with the stationary contacts 50 and 51 to close the circuit of either solenoid 43 or 44 through a return wire 53 electrically connected between the movable contact 52 and the opposite side of source 42.

The meter 45 is in the present case illustrated as a wattmeter connected in line 10 to measure the power flowing between the main induction machine 12 and the 25 cycle system. The connections and adjustments of the contact making wattmeter will depend upon the load conditions which it is desired to automatically maintain in any given installation.

When the switch 48 is thrown to the right, the circuits of the contactor solenoids 43 and 44 will be connected to the source 42 through the normally open manually operated control switches 46 and 47 respectively. It will now be evident that the control of the excitation to the secondary of the main induction machine 12 may be effected either automatically by the contact making wattmeter 45 when the switch 48 is thrown to the left, or manually, by the control switches 46 and 47 when the switch 48 is thrown to the right.

To bring the set up to speed, the line switch 16 of the synchronous machine will be open and the switch 60 thrown to the left to disconnect the secondary of machine 12 from the exciting machine 23. The set will then be started by closing line switch 16 to bring the induction machine up to speed as an induction motor in the usual way. The auxiliary exciter set consisting of machines 24 and 23 will be brought up to speed and switch 48 will be thrown to the right for manual control. The phase rotation of the ohmic drop exciter is preferably such that when switch 60 is now thrown to the right to connect slip rings 20 to the exciting machine 23, the phase rotation will be correct for under-synchronous operation. The reversing switch usually included between machine 23 and the ohmic drop exciter 29 for reversing the phase rotations when the speed of the main motor is regulated through synchronism may thus be omitted in the present case.

The brushes of the ohmic drop exciter 29 are now shifted by means of the manual control apparatus until the speed of the set corresponds to the synchronous speed of machine 13. Thus, to decrease the speed of motor 12, brushes 27 are shifted in a direction to increase the voltage supplied by the ohmic drop exciter 29 and accordingly the voltage generated by the exciter 23 which opposes the secondary voltage of the induction machine 12. The synchronous machine 13 is then brought up to full voltage and synchronized with the 60 cycle line 11 in the usual way and the line switch 16 closed, thus tieing the 25 and 60 cycle systems together through the frequency changer set. It will thus be evident that the synchronizing problem is made much simpler with my improved frequency changer than with the previous types of frequency changers.

It will now be evident to those skilled in the art that the set may be controlled in the present instance by shifting the brushes on the ohmic drop exciter so that power may be transferred through the set in either direction. The brush shifting may be accomplished either manually or automatically in response to some variable such for example as the load passing through the set or a variation in the frequency relation between the two systems. It is well known that the frequency of the usual alternating current system has a tendency to vary slightly from its normal value due to changing load conditions on the apparatus connected thereto. If two such systems are tied together with a frequency changer set of the synchronous type, the set must be of sufficient load capacity as compared to the capacity of the two systems to prevent any variation in the frequency relation between the systems; otherwise the frequency changer set would become overloaded necessitating disconnecting the tie between the two systems. On the other hand, if the two systems are tied together with a set in which one or both machines are of the induction type without speed control, it is necessary that there be a substantial variation in the frequency relation if the direction of power flow through the set is to be changed since the usual induction machine must run below synchronism as a motor and above synchronism as a generator. With my improved frequency converter neither of these conditions are necessary nor are they detrimental. The speed relation between the two machines of the set may be changed either manually or automatically and in the same manner the induction machine can be made to operate either as a generator or a motor above or below synchronous speed. The direction and magnitude of the load transferred may be made to depend partially on the natural variations in the frequency relation between the two systems and partially on a change in the speed relation of the two machines, brought about by an automatic adjustment of the control apparatus in case the frequency relation varies beyond a predetermined amount. Such a combination provides an ideal tie between the two systems and operates in a manner now to be explained.

Referring to the drawing, let us assume that the contact making wattmeter 45 is connected and adjusted so that its movable contact 52 stands in the central position shown when the load through the set is substantially zero, but it makes contact at 51 when the set becomes slightly overloaded with machine 12 acting as a generator and at 50 when the sets become slightly overloaded with machine 12 acting as a motor. Switch 48 will be thrown to the left for automatic control and the brushes of the ohmic drop exciter will have an initial adjustment in about the center of their range of control such that the load through the set is zero when the frequencies on the two systems are exactly correct. Now, let us assume that the frequency of the 60 cycle system increases slightly. Machine 13 will commence to drive machine 12, which now acts as a generator, transferring power from the 60 cycle system to the 25 cycle system. If the change in frequency is not sufficient to overload the set, there will be no change in the setting of the regulating apparatus. Let us assume however that the change in frequency is sufficient to produce an overloading of the set with the initial setting of the regulating apparatus so that contact 52 makes contact at 51 and closes the circuit of contactor solenoid 44. Contactor 41 closes, motor 33 starts and the brushes of the ohmic drop exciter 29 are shifted in a direction to decrease the excitation supplied through exciter 23 to the slip rings of machine 12. This will decrease the tendency of machine 12 to act as a generator and it will be relieved of a portion of its load. As soon as the brushes of the ohmic drop exciter have been shifted far enough for the set to operate at about normal load, contacts 51 and 52 will separate and motor 33 will stop leaving the set operating with a new adjustment of the speed relation between the machines thereof. The automatic control prevents excessive overloads of the set and yet permits a regulation such that the set will be fully utilized with comparatively small changes in frequency between the two systems.

A change in the frequency relation in the opposite direction will, first, cause machine 12 to operate as a motor to drive machine 13 thereby transferring power in the opposite direction, and second, a readjustment of the speed relation between the two machines by reason of the closing of contacts 50 and 52 and contactor 40 and the operation of the brush shifting motor 29 in a direction to increase the excitation of machine 23. It will be understood that when machine 12 acts as a generator, energy is fed to its secondary through the regulating set consisting of machines 23 and 24 and when machine 12 acts as a motor, energy is fed from its secondary to the regulating set.

From the foregoing discussion, it will be seen that it is not necessary to select any particular number of poles for either the synchronous machine 13 or the induction machine 12 since the only limitation in fixing the speed of the set is the number of poles of machine 13. This is a considerable advantage. Heretofore the highest speed possible for a direct connected 60 cycle-25 cycle frequency changer set was 300 R. P. M. in which the 60 cycle machine had 24 poles and the 25 cycle machine 10 poles, a much more costly set than the one hereinbefore described. The added expense of the controlling apparatus necessary with my invention is largely offset by the greater flexibility available with this type of frequency converter. The synchronous machine of the set shown in the drawing might be made with 8 poles instead of 10, in which case its synchronous speed would be 900 R. P. M. and the induction machine would be required to run above its synchronous speed which is entirely possible and practicable, or, the set hereinbefore described might be used between 40 and 25 cycle systems in which case it would run at 480 R. P. M., also entirely possible and practicable. This type of frequency converter may be used with automatic load control, as mentioned above, for limiting the load output to a railway system by reducing the speed and consequently the frequency when the load demands exceed a fixed value. The polar relation, speed and type of control apparatus to be selected in any given instance will depend upon the conditions to be met. In general, it will be advisable to select a speed other than the synchronous speed of the induction machine since the control apparatus required for synchronous operation of the induction machine becomes more complicated. It is not essential that the two systems be of different frequencies, as conditions may arise where it is desirable to provide a more or less flexible tie between two systems of the same frequency, nor is it essential that the machine 13 be of the synchronous type. In either case the new results obtained by my invention would still exist and consequently I do not wish to limit my invention in these respects.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other arrangements.

What I claim as new and desire to secure by Letters Patent of the United States, is:—

1. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, and means for applying an adjustable voltage in the secondary circuit of said asynchronous machine of the same frequency as the frequency of the secondary of said asynchronous machine.

2. In combination, two alternating current systems each of which has its own generating apparatus of substantially fixed frequency, means for tieing said systems together comprising a pair of mechanically connected alternating current dynamo electric machines having their primaries respectively electrically connected to said systems, one of said machines being synchronous and the other asynchronous, and means for applying an adjustable voltage in the secondary circuit of said asynchronous machine of the same frequency as the frequency of the secondary of said asynchronous machine.

3. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, and means for applying a voltage in the secondary circuit of said asynchronous machine of the same frequency as the frequency of the secondary of said asynchronous machine, and means for varying said voltage to vary the interchange of energy between said systems.

4. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, and means for applying an adjustable voltage in the secondary circuit of said asynchronous machine of the same frequency as the frequency of the secondary of said asynchronous machine, said means comprising a dynamo electric regulator electrically connected to the secondary of said asynchronous machine.

5. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, means for applying a voltage in the secondary circuit of the asynchronous machine of the same frequency as the frequency of the secondary of said asynchronous machine, said means comprising a dynamo electric regulator electrically connected to the secondary of said asynchronous machine, and means for varying said voltage to vary the direction of the interchange of energy between said systems.

6. A frequency converter set comprising a pair of mechanically connected alternating current dynamo electric machines, at least one of which is of the asynchronous type and provided with auxiliary apparatus for adjusting its speed-frequency relation for a given load and automatic means responsive to overloads in either direction through said set for adjusting the speed-frequency relation of said asynchronous machine in a direction to reduce the load through said set.

7. In combination with two alternating current distribution systems each of which has its own generating apparatus of substantially fixed frequency, two alternating current dynamo electric machines having their primaries connected to said systems respectively and having their rotors mechanically connected together in such relation that when one machine is running synchronously with the system to which it is connected, the other machine is compelled to run at a non-synchronous speed with respect to the other system, said last mentioned machine being of the wound secondry asynchronous type and auxiliary apparatus associated with said asynchronous machine for applying an adjustable voltage in the secondary circuit of said asynchronous machine having the same frequency as the frequency of the secondary of the asynchronous machine.

8. A frequency changer set comprising a pair of mechanically connected alternating current dynamo electric machines, one of which is an asynchronous machine of the wound secondary type, an alternating current exciter electrically connected to the secondary winding of said asynchronous machine, an ohmic drop exciter arranged to supply excitation to said first mentioned exciter at a frequency proportional to the slip frequency of said asynchronous machine and means for shifting the brushes on said ohmic drop exciter to vary the direction and magnitude of the load carried by said set.

9. A frequency changer set comprising a pair of mechanically connected alternating current dynamo electric machines adapted to be respectively electrically connected to two alternating current distribution systems, one of said machines being of the asynchronous type and provided with auxiliary exciting means for applying an adjustable voltage in the secondary circuit of said asynchronous machine having the same frequency as the secondary frequency of said machine, a motor for adjusting the setting of the auxiliary controlling apparatus, manual means for controlling said motor for the purpose of synchronizing said set, automatic means responsive to the load on the set for controlling said motor and means for changing the control of said motor from the manual to the automatic means and vice versa.

In witness whereof, I have hereunto set my hand this tenth day of May 1923.

CARL M. GILT.

DISCLAIMER 1,593,400.—*Carl M. Gilt*, Brooklyn, N. Y. FREQUENCY CONVERTER. Patent dated July 20, 1926. Disclaimer filed November 12, 1930, by the assignee, *General Electric Company*.

Hereby enters this disclaimer to claims 1, 2, 3, 4, 5, 7, and 8 of said patent which are in the following words:

"1. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, and means for applying an adjustable voltage in the secondary circuit of said asynchronous machine of the same frequency as the frequency of the secondary of said asynchronous machine.

"2. In combination, two alternating current systems each of which has its own generating apparatus of substantially fixed frequency, means for tieing said systems together comprising a pair of mechanically connected alternating current dynamo electric machines having their primaries respectively electrically connected to said systems, one of said machines being synchronous and the other asynchronous, and means for applying an adjustable voltage in the secondary circuit of said asynchronous machine of the same frequency as the frequency of the secondary of said asynchronous machine.

"3. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, and means for applying a voltage in the secondary circuit of said asynchronous machine of the same frequency as the frequency of the secondary of said asynchronous machine, and means for varying said voltage to vary the interchange of energy between said systems.

"4. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, and means for applying an adjustable voltage in the secondary circuit of said asynchronous machine of the same frequency as the frequency of the secondary of said asynchronous machine, said means comprising a dynamo electric regulator electrically connected to the secondary of said asynchronous machine.

"5. In combination, two alternating current systems each of which has its own generating apparatus of substantially fixed frequency, means for tieing said systems together comprising a pair of mechanically connected alternating current dynamo electric machines having their primaries respectively electrically connected to said systems, at least one of said machines being of the asynchronous type, means for applying a voltage in the secondary circuit of the asynchronous machine of the same frequency as the frequency of the secondary of said asynchronous machine, said means comprising a dynamo electric regulator electrically connected to the secondary of said asynchronous machine, and means for varying said voltage to vary the direction of the interchange of energy between said systems."

"7. In combination with two alternating current distribution systems each of which has its own generating apparatus of substantially fixed frequency, two alternating current dynamo electric machines having their primaries connected to said systems respectively and having their rotors mechanically connected together in such relation that when one machine is running synchronously with the system to which it is connected, the other machine is compelled to run at a non-synchronous speed with respect to the other system, said last mentioned machine being of the wound secondary asynchronous type and auxiliary apparatus associated with said asynchronous machine for applying an adjustable voltage in the secondary circuit of said asynchronous machine having the same frequency as the frequency of the secondary of the asynchronous machine.

"8. A frequency changer set comprising a pair of mechanically connected alternating current dynamo electric machines, one of which is an asynchronous machine of the wound secondary type, an alternating current exciter electrically connected to the secondary winding of said asynchronous machine, an ohmic drop exciter arranged to supply excitation to said first mentioned exciter at a frequency proportional to the slip frequency of said asynchronous machine and means for shifting the brushes on said ohmic drop exciter to vary the direction and magnitude of the load carried by said set."

[*Official Gazette December 9, 1930.*]